Nov. 21, 1950  R. S. PIZER  2,530,725
RADIANT ENERGY CONTROL SYSTEM FOR AIRCRAFT
Filed Dec. 9, 1947  2 Sheets-Sheet 1
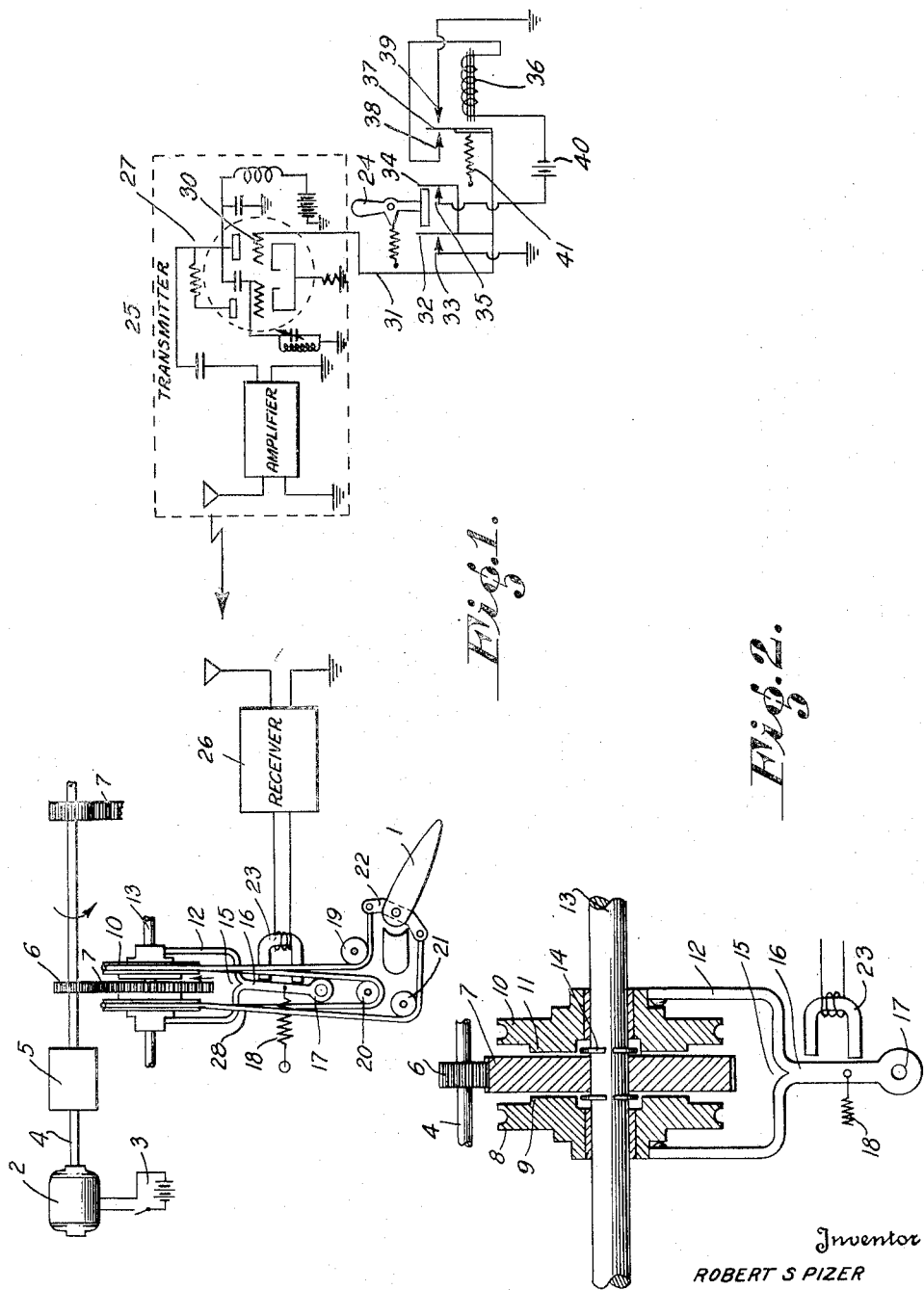
Inventor
ROBERT S PIZER
By
Henry Heyman
ATTORNEY

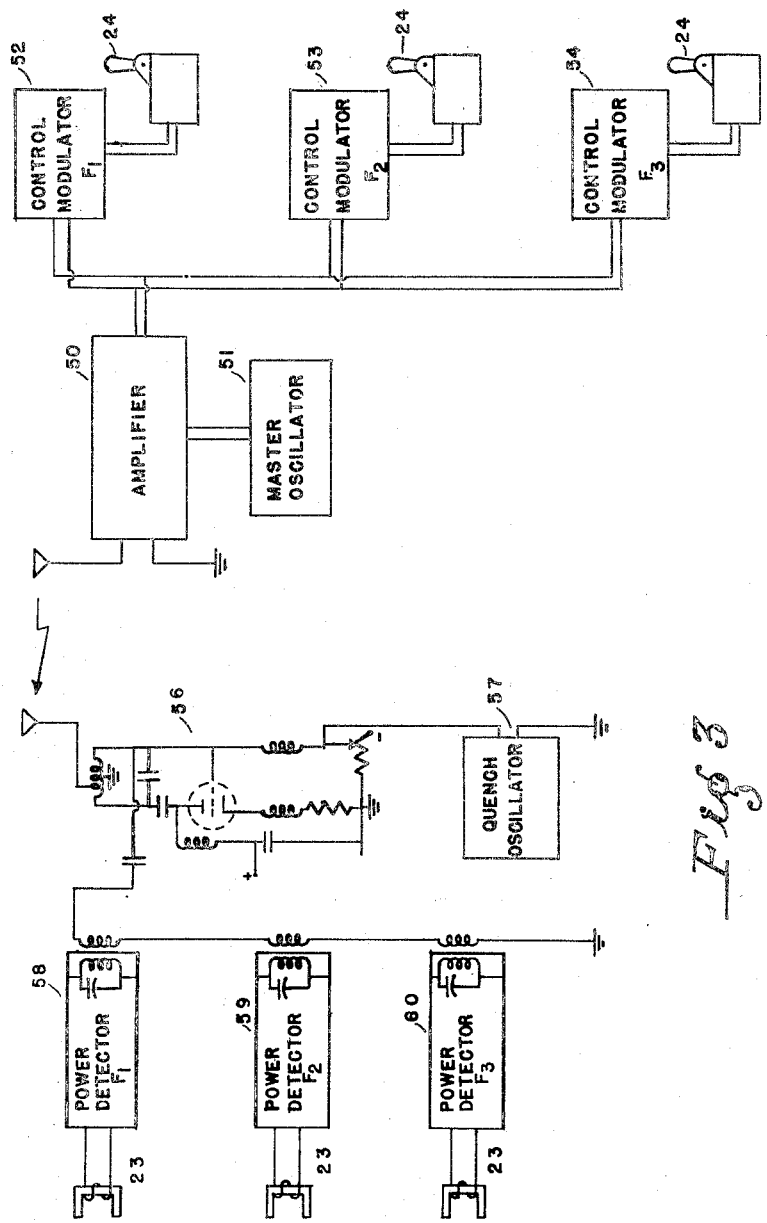

Patented Nov. 21, 1950

2,530,725

UNITED STATES PATENT OFFICE 2,530,725

RADIANT ENERGY CONTROL SYSTEM FOR AIRCRAFT

Robert S. Pizer, Washington, D. C.

Application December 9, 1947, Serial No. 790,580

6 Claims. (Cl. 244—77)

This invention relates to a remote control system for vehicles and particularly to a system whereby the attitude of an aircraft as well as operable devices on the aircraft may be controlled by means of radiant energy signals from a ground station. The system to be described is particularly adapted for use in the control of model aircraft.

A number of different systems have been devised for the remote control of aircraft, but in practically all cases, these systems are complicated from both the viewpoint of structure and use. It is, therefore, an object of my invention to provide a simplified system for remotely controlling the aircraft.

A particular problem with respect to remotely controlled aircraft is the fact that if the control system should fail, the aircraft is apt to dive into the ground and be demolished. My invention eliminates this hazard by providing a system whereby in the event of failure of the remote control system, the aircraft automatically is put into an attitude of climb or spiral.

The novel feature which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which:

Figure 1 represents a schematic representation of the control apparatus in the aircraft and the controlling system on the ground, and Figure 2 shows an enlarged view of a radio controlled clutch which is an essential part of my invention. Fig. 3 is a block and schematic diagram of a preferred multi-channel embodiment.

Referring to Figure 1, I show a control surface indicated by the numeral 1. As previously indicated, it is desirable that this control surface be subject to positioning by a remote radiant energy transmitter. It is also desirable that in the event of failure of the radiant energy system that this control surface shall go into extreme counterclockwise position in order to put the aircraft in a position of climb if the wings are in a level attitude or spiral if in a banked attitude. To this end I provide a small motor designated by the numeral 2 and energized by a source of power 3. The motor is coupled to a small gear 6 through a shaft 4 and reducing gear box 5. The gear 6 is engaged with a larger gear 7. Gear 7 is supported by a shaft 13 and has positioned on either side of it a pair of axially slidable pulleys 8 and 10. The pulleys 8 and 10 each have a frictional surface facing the gear faces 7. The pulleys 8 and 10 are connected to the horn of the control element 1 by means of a continuous cable 28 which is guided along its path by idler pulleys 19 and 20 and 21.

If it is assumed that pulley 10 is in frictional engagement with gear 7 which is driven in a counterclockwise direction by the clockwise rotation of motor gear 6, pulley 10 will also rotate counterclockwise; that is, in a direction upward as viewed in Figure 1. The motion of the pulley 10 will therefore be transmitted to the horn 22 of the control surface so as to deflect the control surface upward. Now, if it is assumed that pulley 10 is disengaged from contact with gear 7 and instead that pulley 8 is engaged with gear 7 the operation just described will be reversed and control surface 1 will be deflected downward. It is therefore necessary, if this operation is to be effected at will, that means be provided to cause one or the other of the pulleys 8 or 10 to engage with the gear 7 at will. It is also necessary if the control surface is to be automatically deflected upward in the absence of extraneous control that means be provided to cause pulley 10 to engage the frictional face of gear 7. To this end I provide a clutch control member designated generally by numeral 15 in the form of a fork having tines 12, and arm 15, and a pivot 17. The tines are two in number. One is arranged to urge pulley 8 in contact with gear 7, and the other is arranged to urge pulley 10 in contact with gear 7. Since the tines are rigidly secured to the arm 16, this operation can only be alternated; that is, either one or the other of the pulleys may be urged against a face of gear 7, but not both at the same time. A spring 18 is provided to urge the clutch arm 15 in such a direction that in the absence of a radiant energy signal the pulley 10 is urged in contact with gear 7.

Referring to Figure 2, I show my electrically controllable clutch in greater detail. Each of the pulleys is formed of light rigid material and has a surface which may be serrated or roughened to increase its friction where it opposes a lateral face of drive gear 7. Drive gear 7 is secured to shaft 13 against axial movement by any convenient means such as split rings 14 seating in annular grooves in shaft 13. The pulleys 8 and 10 are axially slidable and are counterbored to provide clearance for the split rings. The amount of axial movement of pulleys 8 and 10 when one or the other is being controlled, is minute, the actual control being effected more by changes in pressure than changes in axial position.

The tines 12 of clutch control element 15 are so spaced as to provide a minute amount of axial play between the assembly of parts comprising gear 7 and pulleys 8 and 10.

In order that the control surface may be positioned in any desirable attitude, it is necessary that means be provided for controlling the position of clutch control element 15 at will. To this end, I provide an electric magnet 23 having a coil which, when energized, causes the clutch control element 16 to be drawn to the right and thereby engages pulley 8 with gear 7. If it is desired that the control surface be maintained in a given position, the current may be supplied to electromagnet 23 in the form of pulses in which the duration of the pulse is equal to the space between pulses. In this way, the control element of the clutch, and, therefore, the pulleys, will be reciprocated back and forth so that each pulley receives an equal urge in opposite directions; and, therefore, the resultant motion of the horn of the control element is averaged out to zero.

It is desirable that three conditions of control for each control surface of the aircraft be available. The first condition is that wherein the electromagnet is not energized so that the clutch is urged to the left by the spring 18 to thereby cause the control surface 1 to be deflected upward. The second condition is that where the pulleys alternately engage the gear 7 so as to maintain the control surface in a given position, and the third desirable condition is that where the clutch control element is urged to the right, and thereby, the pulley 8 causes the control surface to be deflected downward.

To effect these conditions, I supply a receiver 26 and a transmitter 25 subject to the control of a controller 24. The receiver may be any conventional type of receiver equipped with a rectifier in its output in order to supply direct current to the coil of magnet 23. The transmitter comprises an oscillator and a radio frequency amplifier of any desirable type.

To the end that the oscillator and, therefore, the transmitter can be controlled at will to be quiescent or emit continuous signals or pulsed signals, I provide a manually operable controller 24 which is arranged to condition the grid circuit of grid 30 of the transmitter oscillator 27. To this end I provide a switch having contacts 32 and 34 which may be moved in unison by controller 24 to either side of a normal midposition.

In one side position the transmitter is caused to radiate continuously so as to change the course of the aircraft. In the midposition, the transmitter is caused to emit pulses of equal duration to the space between pulses. In the other side position, the transmitter is caused to be quiescent so as to permit the attitude of the aircraft to go into any preselected attitude, preferably climb or spiral.

When the controller handle is urged to the right, thereby causing contacts 32 and 33 to meet, grid 30 of oscillator 27 is grounded thereby causing the transmitter to radiate continuously for so long as the controller is held in this position.

When the controller is in midposition in which it is normally held by spring means, the oscillator is pulsed on and off. To this end, I provide a pair of contacts 37 and 39 which are intermittently joined and separated by the action of electromagnet 36, battery 40, spring 41, and contacts 37 and 38. Assuming that the contact blade 37 which is the armature for electromagnet 36 is contacting contact 38, an energization circuit for the electromagnet is completed from battery 40, electromagnet 36, contacts 37 and 38, and contacts 34 and 35. Energization of electromagnet 36 causes contacts 37 and 38 to be broken as in any vibrator which thereby deenergizes the electromagnet and permits spring 41 to move contact 37 so as to again complete the energization circuit.

During each stroke of the blade of contact 37, contact is made with contact 39 which thereby grounds grid 30 so that the oscillator is caused to operate. The vibrator is so adjusted as to permit engagement between contacts 37 and 39 for half the period of each vibration cycle. The oscillator and, therefore, the transmitter generates pulses of even period with quiescent periods between pulses. Under this condition, the pulleys 8 and 10 are alternately engaged with drive gear 7 so that the resultant motion applied to control surface 1 is zero and, therefore, the control surface remains in whatever condition it has previously been placed.

Other means than a vibrator may be employed for pulsing the oscillator such as, for instance, a cam, or cams, on a motor shaft arranged to operate a switch or switches in any well-known manner.

The third position of controller 24 opens contacts 34 and 35 which thereby open the grid circuit of oscillator 27 and thereby disables it.

In accordance with the position of the controller, the following operations take place in the aircraft.

When the controller is moved to the right, the receiver energizes electromagnet 23 which urges pulley 8 against drive gear 7 so that it is driven clockwise, thereby slowly deflecting control surface 1 downward.

When the control surface has attained the desired position as evidenced by the attitude of the aircraft, the controller is released and returns to midposition. In this position, the clutch control arm 16 is alternated back and forth under the alternate action of electromagnet 23 and spring 18 so that the control surface of the aircraft is maintained in its previously attained position.

When the controller is moved to the left, the transmitter is quiescent thereby permitting spring 18 to continuously engage pulley 10 with drive gear 7 so that the control surface is caused to rotate counterclockwise to climb or spiral condition.

For purposes of simplicity, I have shown and described my invention as applied to one control surface. It is apparent that I can engage as many clutch and drive mechanisms with the motor 2, as there are controls to be actuated. It is my intention to provide as many frequency selective transmitting and receiving systems as there are operations to be separately performed on the vehicle.

My apparatus is not limited to include the particular oscillator shown, it being only necessary that any known type of oscillator be arranged for the three conditions of operation previously described.

A preferred organization of a multi-channel control signal source and a multi-channel responding system for a vehicle is shown in Figure 3. In this embodiment, I show a transmitter comprising a radio frequency amplifier 50 arranged to emit continuously at a frequency determined by the master oscillator 51. In order to selectively actuate different controls on the vehicle, I provide a plurality of modulation oscillators designated as control modulators 52, 53, and 54. These modulators generate oscillations having frequencies $F_1$, $F_2$, and $F_3$, respectively, and may be similar to the oscillator shown at 27 in Figure 1. Each of these control modulators is provided with the controller 24 previously described with respect to Figure 1. The receiver provided on the vehicle or aircraft is preferably of a superregenerative type as shown by reference numeral 56 and has the usual quench oscillator shown at 57. The receiver 56 is tuned to the frequency of the master oscillator 51 of the transmitter. It therefore receives a continuous wave signal when the system is in operation. I couple to the output of the receiver a plurality of detectors denoted by numerals 58, 59, and 60, tuned respectively to the frequencies $F_1$, $F_2$, and $F_3$. Each of the detectors is coupled to the electromagnet element of a clutch unit similar to that shown in Figures 1 and 2. It follows that the transmitter can be modulated at the will of the operator with one or more modulation frequencies which are either continuous, intermittent, or quiescent.

It is therefore apparent that although a single transmitter is used, one or more of the vehicle control surfaces can be actuated at the will of the transmitter operator either in sequence or simultaneously.

This embodiment minimizes the possibility of interference with the attitude of one vehicle due to the accidental reception of a radio signal other than that emitted by the transmitter under the control of the vehicle's remote operator. Further, a number of systems corresponding to this embodiment may be used in close proximity to one another and on the same carrier frequency, the only requirement to prevent interference between control signals and different vehicles being that the modulation frequencies be different.

Another advantage flowing from this arrangement lies in the fact that a plurality of vehicles can be controlled by a single transmitter, the only requirement for the control of each respective vehicle being that it be allotted its own respective modulation frequencies.

Having fully described my invention, what I claim is:

1. In a remote control system for aircraft, an aircraft having control surfaces, and cable means for moving each control surface, said cable means engaging a pair of pulleys, said pulleys being supported on a shaft for rotational and axial movement thereon, a driven disc supported on the shaft between said pulleys and in proximity therewith, clutch fork means engaging said pulleys to control the axial position thereof; and an electromagnet in proximity to said clutch fork on one side thereof to cause axial movement of one of said pulleys into engagement with the driven disc when energized, and spring means on an opposite side of said clutch fork to cause the other of said pulleys to move axially into engagement with the driven disc when the electromagnet is deenergized, whereby said control surface is moved in a first direction when the electromagnet is energized, and in a second direction when the electromagnet is deenergized.

2. In a remote control system for aircraft, an aircraft having a radio receiver and a ground control radio transmitter, said aircraft having control surfaces, and cable means for moving each control surface, said cable means engaging a pair of pulleys, said pulleys being supported on a shaft for rotational and axial movement thereon, a driven disc supported on the shaft between said pulleys and in proximity therewith, clutch fork means engaging said pulleys to control the axial position thereof, an electromagnet in proximity to said clutch fork on one side thereof to cause axial movement of one of said pulleys into engagement with the driven disc when energized, and spring means on an opposite side of said clutch fork to cause the other of said pulleys to move axially into engagement with the driven disc when the electromagnet is deenergized, said electromagnet being connected to said receiver whereby when a signal is received, said receiver energizes the electromagnet to cause the control surface to move in a selected direction.

3. In a remote control system for aircraft, an aircraft having a radio receiver and a ground control radio transmitter, said aircraft having control surfaces, and cable means for moving each control surface, said cable means engaging a pair of pulleys, said pulleys being supported on a shaft for rotational and axial movement thereon, a driven disc supported on the shaft between said pulleys and in proximity therewith, clutch fork means engaging said pulleys to control the axial position thereof, an electromagnet in proximity to said clutch fork on one side thereof to cause axial movement of one of said pulleys into engagement with the driven disc when energized, and spring means on an opposite side of said clutch fork to cause the other of said pulleys to move axially into engagement with the driven disc when the electromagnet is deenergized, said electromagnet being connected to said receiver whereby when a signal is received, said receiver energizes the electromagnet to cause the control surface to move in a first direction, said transmitter including a controller having three positions whereby in a first position, the transmitter radiates continuously; in a second position the transmitter radiates spaced pulses equal in length to the space between pulses; and in a third position the transmitter is quiescent, so that the control surface of the aircraft is caused to move toward a first position, to maintain a position, or move toward a position respectively opposite to the first position.

4. In a remote control system for aircraft, an aircraft having a radio receiver and a ground control radio transmitter, said aircraft having control surfaces, and cable means for moving each control surface, said cable means engaging a pair of pulleys, said pulleys being supported on a shaft for rotational and axial movement thereon, a driven disc supported on the shaft between said pulleys and in proximity therewith, clutch fork means engaging said pulleys to control the axial position thereof, an electromagnet in proximity to said clutch fork on one side thereof to cause axial movement of one of said pulleys into engagement with the driven disc when energized, and spring means on an opposite side of said clutch fork to cause the other of said pulleys to move axially into engagement with the driven disc when the electromagnet is deenergized, said electromagnet being connected to said receiver whereby when a signal is received, said receiver energizes the electromagnet to cause the control surface to move in a first direction, said transmitter including a controller having three positions whereby in a first position, the transmitter radiates continuously, in a second position the transmitter radiates spaced pulses equal in length to the space between pulses, and in a third position the transmitter is quiescent, so that the control surface of the aircraft is caused to move toward a dive position, to maintain a position, or move toward a climb position respectively; said transmitter including an oscillator and an oscillator circuit including a vibrator, said controller engaging switch means in the oscillator circuit whereby in the first position the oscillator operates continuously; in the second position the oscillator operates intermittently in accordance with the period of said vibrator; and in the third position the oscillator is disabled.

5. In a system for the remote control of vehicles, a control transmitter comprising a wave energy generator for producing a carrier wave of a first frequency, a plurality of modulation wave energy generators of different frequencies lower than the first frequency for modulating the carrier wave, control means for each of the modulation wave energy generators having first, second and third positions in which the modulation wave energy generator is caused to be energized continuously, to be pulsatingly active with equal time intervals for the pulses and the duration between pulses, and quiescent respectively; a receiver supported on the vehicle and being receptive to the carrier wave, and having in its output a plurality of detectors tuned to a respective one of the modulation wave energy frequencies; directional control elements on the vehicle, a plurality of power means, reversible clutch means connecting each power means to each directional control element, an armature element linked to said clutch means, and an electromagnet supported adjacent said armature to engage said clutch means for operation in a first selected direction when energized, spring means linked to said armature in opposed relation to the electromagnet to engage the clutch means for operation opposite to the first selected direction when the electromagnet is de-energized; said electromagnet being connected to a respective one of said detectors whereby selective positioning of a selected modulation wave energy generator control into first, second or third position causes a selected vehicle directional control element to move in a first selected direction, to maintain a position, and to move in a direction opposite to the first direction respectively.

6. In a system for remote control of a vehicle, a transmitter adapted to radiate wave energy of a selected frequency, at least one modulator adapted to superpose wave energy of selected modulation frequency on said transmitter selected frequency, a switch for said modulator having three positions, means connected to said switch in the first position for de-activating said modulator, means connected to the switch in a second position for turning on and off the modulator at equal intervals, and means connected to the switch in the third position for activating the modulator continuously; a receiver on the vehicle responsive to the transmitter selected frequency and at least one detector connected to the receiver and responsive to the modulator frequency, a clutch mechanism comprising a driven disc having opposed friction faces, a pulley coaxially supported on each side of the disc and axially movable with respect thereto, a yoke mechanism linking the pulleys, a spring connected to the yoke to urge one of the pulleys into engagement with the disc, and an electromagnet positioned proximate the yoke to urge the other pulley into engagement with the disc, said electromagnet being connected to said detector whereby in the first position of said transmitter switch, the electromagnet is de-energized and the spring urges the said one of the pulleys into engagement with the disc, in the second transmitter switch position, the electromagnet is alternately energized and de-energized at equal intervals so that the yoke is translated back and forth alternately by the electromagnet and the spring whereby the pulleys are alternately actuated; and in the third transmitter position, the electromagnet is energized continuously to thereby cause the continuous activation of the other of the said pulleys.

ROBERT S. PIZER.

REFERENCES CITED

The following references are of record in the file of this patent:

UNITED STATES PATENTS

| Number | Name | Date |
|---|---|---|
| 1,024,393 | Ellsworth | Apr. 23, 1912 |
| 1,118,743 | Cooperider | Nov. 24, 1914 |
| 1,368,226 | Sperry | Feb. 8, 1921 |
| 2,393,892 | De Ganahl | Jan. 29, 1946 |
| 2,397,476 | Maxson et al. | Apr. 2, 1946 |